INVENTOR
EDWARD M. SORENSEN

May 2, 1944.                 E. M. SORENSEN                    2,347,714
                          PROPORTIONALIZING CONTROL
                          Filed Sept. 5, 1941          4 Sheets-Sheet 3

INVENTOR
EDWARD M. SORENSEN
BY
ATTORNEYS

INVENTOR
EDWARD M. SORENSEN
ATTORNEYS

Patented May 2, 1944

2,347,714

UNITED STATES PATENT OFFICE 2,347,714

PROPORTIONALIZING CONTROL

Edward M. Sorensen, Coscob, Conn.

Application September 5, 1941, Serial No. 409,702

29 Claims. (Cl. 175—320)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a power control system herein designated as a proportionalizing control.

The primary object of the invention is to provide an improved control system which in itself has negligible inertia, and which has characteristics tending to overcome objectionable effects of inertia in bodies controlled by the system, or, in other words, to prevent so-called over-shooting and hunting. This is accomplished by making the amount of the control effect, or correction, proportional to the magnitude of adjustment that is required. In this manner the system may be said to anticipate the necessary control effect at any moment, so that when a large adjustment is required a correspondingly large control effect will be exerted, and when a slight adjustment is required the control effect will be correspondingly slight.

The principle of the invention follows the analogy of moving a mass exactly into a given position in the shortest possible time. A large force is first applied to overcome inertia and start the mass moving, after which the moving force is constantly reduced as the mass approaches the given position, until finally the moving force is reduced to zero and the mass comes to rest exactly in the given position without overriding or hunting. Whether the inertia of the mass is large or small will be immaterial if the moving force is always strictly proportioned to the remaining adjustment that is required, for as soon as the mass moves toward the given position, the applied energy, whether large or small in amount, will be reduced in accordance with the response produced thereby. It may be assumed in practical applications that a retarding force of some kind, such as friction, is present to tend to arrest the motion of the mass when the moving force is discontinued, but a retarding force is not necessary to practice the invention.

In the present invention the control energy is normally limited to a value which is insufficient to produce a control effect continuously. Means are provided for storing this energy until a sufficient amount has accumulated to exert a control effect. The stored energy is then released by a trigger means, and a momentary control, or corrective, effect is produced. Thus, the control effect, when required, will normally be exerted periodically, the time interval between successive releases depending upon the time required to store up the requisite amount of energy to actuate the trigger means. It will be seen, then, that if the amount of control energy is small the control effects will occur less frequently than if the amount of control energy is large. A further characteristic of the present invention is that when the control energy exceeds a predetermined amount, corresponding to the requirement for a large or abnormal correction, a continuous control effect may be exerted. In other words, as the control energy is increased, the length of time required to store sufficient energy to actuate the trigger means becomes less, until finally the amount of energy is sufficient to exert a continuous control effect.

In the following specification and drawings the control energy is in the form of electrical energy, the energy storing means comprises a condenser, and the energy releasing, or trigger, means comprises a gaseous discharge tube, but it is to be understood that the present embodiments are for purposes of illustration only and are in no way intended to limit the invention. It is distinctly within the scope of the invention to employ other forms of energy storing means and energy releasing means, and to use other forms of energy, the only limitations being those imposed by the scope of the appended claims. Additional objects and advantages will be apparent as the description proceeds in connection with the accompanying drawings.

This case is a continuation in part of S. N. 335,517 filed May 16, 1940, and S. N. 371,368 filed December 23, 1940, both of which include proportionalizing circuits as herein disclosed. In the above-mentioned applications the proportionalizing circuits are employed in control systems designed to regulate or control a particular operation, the performance of which would normally exhibit inertia effects rendering unsatisfactory known conventional control systems. It is recognized, however that the various embodiments of proportionalizing circuits herein illustrated are capable of general application to any system employing control energy to regulate power means, and it is therefore not intended to limit the present invention to use with any particular system or systems, such, for instance, as are shown in the parent applications above referred to.

Figure 1:
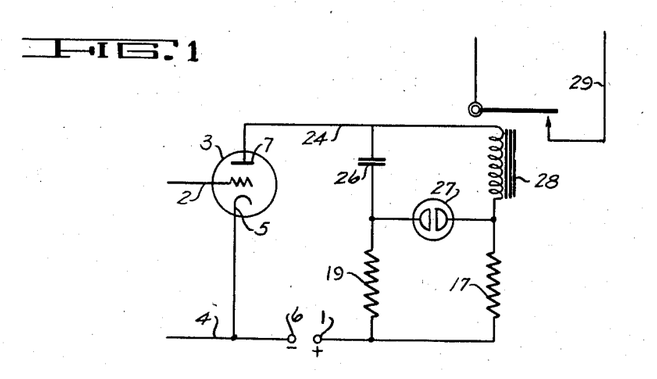
Figure 1 illustrates one basic embodiment of the present invention employing a single relay.

The circuit of Figure 1 is seen to consist of a condenser 26 and a neon tube 27 connected in series and parallel with the relay 28, condenser 26 and relay 28 being commonly connected to the plate lead 24 from vacuum tube 3. At the junction of the neon tube 27 and condenser 26 is a resistor 19, the other terminal of which is connected as at 1 to the plate supply potential. To the junction of the neon tube 27 and the relay winding is connected a resistor 17 having its other terminal also connected to side 1 of the source of potential. Grid 2 of vacuum tube 3 has normally impressed thereon a negative potential. The opposite side of the grid potential as at 4 runs to cathode 5, also connected to the negative side 6 of the plate potential.

To illustrate the action of the above circuit, assume that there is an increase in plate current in the plate 7 in the order of 30 microamperes, due to a less negative potential on grid 2, in response to a received signal. This causes condenser 26 to take a charge through resistor 19, and at the same time a potential is set up across resistor 17. As the charge builds up on condenser 26, the potential across resistor 19 falls until the difference in potentials across resistors 17 and 19 is of a sufficient value to cause ignition of neon tube 27. When neon tube 27 ignites, a discharge path through relay 28 and neon tube 27 is provided for condenser 26. The current flow through relay 28 caused by the discharge of condenser 26 is in excess of the current required to close the relay, so that the same will close during the discharge of the condenser. Thus, the motor or other power device in circuit with the line 29 is put in operation for a brief interval of time. When condenser 26 is discharged, the neon tube extinguishes, since resistor 19 is provided with a great enough resistance to prevent the passing of current of sufficient value to maintain the neon tube ignited. Condenser 26 being discharged, and neon tube 27 being extinguished, the circuit immediately starts to recharge condenser 26 through resistance 19, whereupon the cycle is repeated. If the potential on grid 2 becomes still less negative, the plate current in plate 7 will steadily increase so that the rate at which the neon tube 27 and condenser 26 operate to actuate relay 28 will increase. When the plate current is of sufficient value to maintain the relay continuously closed, the proportionalizing circuit has no more effect until the grid potential is made more negative to a value slightly less than the potential at which the relay is continuously closed. Then the proportionalizing circuit will again actuate the relay intermittently at a decreasing rate until the grid potential reaches its normal value which is a blocking potential sufficiently negative to interrupt the flow of plate current.

In this manner, energy may be supplied to a motor or other power means in the circuit 29 in a pulsating manner, with the rate of pulsations being in direct proportion to the distance the controlled device is from the point corresponding to the above-described normal value of grid potential. However, if a reduction gear of a sizeable ratio is employed, the motion of the controlled element will appear to be substantially continuous and progressive in its rate of increase or decrease.

The values of condenser 26 and resistance 19 determine the rapidity with which the proportionalizing circuit will operate for a given plate current. The value of resistor 17 determines the plate current required to initiate both the proportionalizing action and continuous operation of the relay.

It will be seen that the proportionalizing circuit operates as a function of current, wherein as the plate current is increased across the proportionalizing circuit to an amount corresponding to the ionization potential of the neon tube, the circuit will start to function, due to the increased voltage drop across resistor 17. As the current continues to increase beyond the limits of the proportionalizing circuit, the proportionalizing control will stop and the power means or other device will move at its full rate, but as soon as the mechanical elements of the control approach the desired setting, the proportionalizing circuit functions at a rate equal to the amount the control is out of balance, corresponding to the departure from the normal value of grid potential. Thus, as the control is brought into balance, the proportional rate becomes slower until the balance is just reached, and difficulties from hunting or over-shooting are avoided.

It will be understood that by adjusting the values of resistor 17 or the spring tension on the relay armature, the proportionalizing circuit could be designed to control the operation of the relay 28 also during the maximum operating plate current so that a proportionalizing control might be maintained throughout the range of operation of the controlled device.

Figure 2:
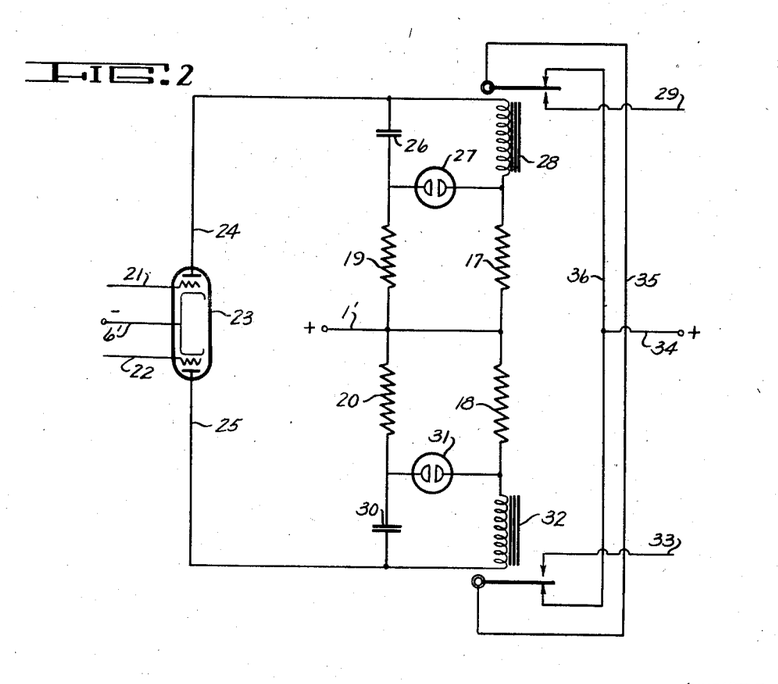
Figure 2 illustrates a push-pull arrangement of the basic system shown in Figure 1, and employing two control relays and two sources of control current.

The system illustrated in Figure 2 constitutes a push-pull adaptation of the system shown in Figure 1 for operating two control relays to produce positive response to control effects in two senses or directions. Two control voltages 21 and 22 are fed into a twin triode tube 23 and individually control respective plate circuits 24 and 25. The action of each plate circuit corresponds to the action described in connection with Figure 1. Thus the plate current in the circuit 24 varies in accordance with the control voltage in the grid circuit 21 to vary the charging time of condenser 26. As in the previously described embodiment the condenser 26 accumulates a charge in each cycle of operation sufficient to ignite the gaseous discharge tube 27 and produce a momentary energization of relay 28 to complete a control circuit 29.

The other half of the system, comprising resistances 18 and 20, condenser 30, gaseous discharge tube 31, relay 32 and control circuit 33, correspond to the elements 17, 19 and 26 to 29, and function in a corresponding manner under the control of the voltage in the grid circuit 22. Plate potential for the twin circuits is applied at the terminals 1', 6'.

The general object of the push-pull arrangement in Figure 2 is to produce a control effect in one direction or sense by means of the control circuit 29, and to produce a control effect opposite in direction or sense through the control circuit 33. Hence in the normal operation of this system the relays 28 and 32 do not operate at the same time. This condition is ordinarily assured by the fact that the condition producing a control effect in the grid circuit 21 would preclude the producing of a control effect in the grid circuit 22, and vice versa. Since obviously it should never be necessary to produce simultaneous corrections in opposite directions or senses in the embodiment shown in Figure 2, the energization of circuits 29 and 33 at the same time may be positively prevented by making it necessary for one relay to be inactive in order for the other to operate, this being done by connecting the supply line 34 to the back contact of the two relay armatures. In this manner at least one of the armatures must be in its back position to establish a circuit to the supply line 34. If both relays 28 and 32 should operate in unison no control effects would then be exerted by either one of the relays.

It is possible, however, to use the push-pull adaptation of Figure 2 in situations requiring the operation of both relays 28 and 32 at the same time, and it is not intended to limit the invention so as to exclude such operation, since by connecting line 34 to line 35 instead of line 36 energization of the control circuits 29 and 33 independently of each other could be established. To obtain simultaneous operation of the relays 28 and 32, however, would require that the signal responsive part of the system (not shown) be adapted to impress sufficient control voltages upon the grids 21 and 22 at the same time to cause control currents to flow in both plate circuits 24 and 25.

Figure 3:
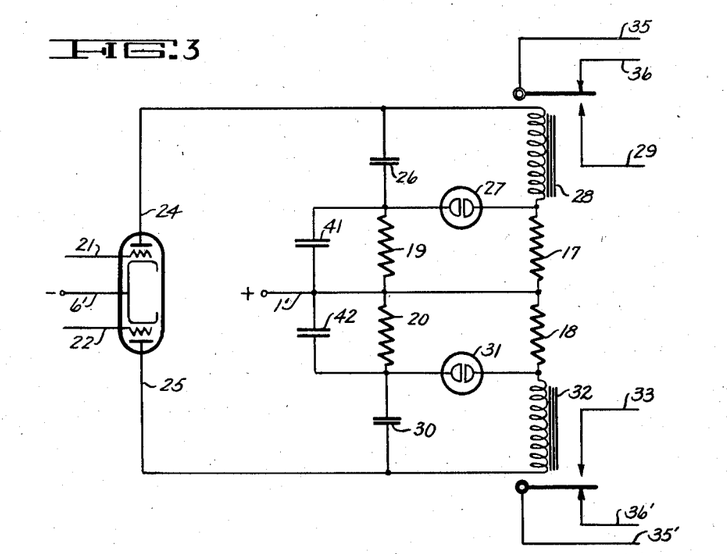
Figure 3 illustrates a modification of the system shown in Figure 2 by the addition of reactance elements to increase the time intervals for charging and discharging of the condensers.

Figure 3 illustrates a variation of the proportionalizing circuit in which reactances such as condensers 41 and 42 are connected in parallel with the resistances 19 and 20 respectively. This arrangement has the effect of increasing the intervals of time required for the condensers 26 and 30 to receive their charges and similarly the times required to discharge. It will also be noted in Figure 3 that the leads 35' and 36' are not connected to the leads 35 and 36, in order to make possible the simultaneous energization of the conductors 29 and 33 by the relays 28 and 32 in response to the control effects imposed thereon. In all other respects the system in Figure 3 operates in the same manner as the system shown in Figure 2, and the elements of Figure 3 which are common to Figure 2 have been given corresponding reference numerals.

Figure 4:
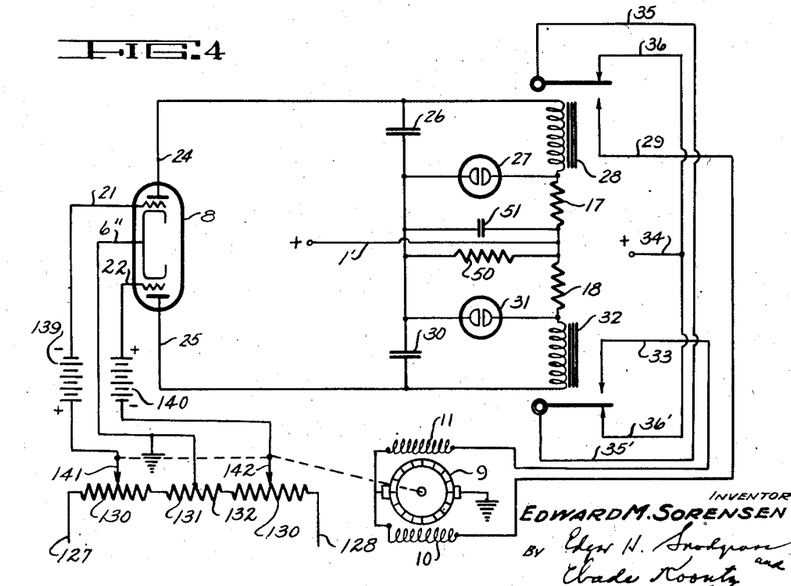
Figure 4 is a modification of the system shown in Figure 2, adding a reactance to increase the time intervals, but having fewer elements than the system of Figure 3 through the use of reactance and resistance elements in common to both sides of the push-pull arrangement, and also including rebalancing means.

If a strictly push-pull operation is desired, that is, if the relays 28 and 32 are never required to operate simultaneously, the number of elements in the system may be reduced as shown in Figure 4. Under these conditions, when only one of the relays is operating at one time, the system of Figure 4 will function in the same manner as that of Figure 3 since the resistance 50 can take the place of either the resistance 19 or the resistance 20, and the condenser 51 can take the place of either the condenser 41 or the condenser 42, depending upon whether the relay 28 or the relay 32 is in operation. (The leads 35 and 36 may be interconnected with 35' and 36', after the manner of Figure 2, if desired.)

Figure 4 also includes balancing means corresponding to that shown in Figure 4 of S. N. 335,-517. Elements of the balancing means common to the parent application have been given the same reference numerals and comprise leads 127, 128, dual potentiometer 130, resistors 131 and 132, batteries 139, 140, and potentiometer arms 141, 142. The cathode lead 6'' is grounded to the negative side of the plate supply and connected between the resistors 131 and 132 since the present Figure 4 does not include compensation for emission variation due to changes in filament potential as shown in the parent application. Points 127 and 128 then represent the signal input to the present proportionalizing and balancing combination and correspond to the respective terminals 127 and 128 in the output circuit of the rectifier and amplifier units in the parent application, but it is understood that the application of the present invention is not limited to the particular receiver and amplifier embodiments disclosed in the parent cases, nor is it limited to the particular types of systems disclosed therein.

Batteries 139 and 140 are of the same potential but are connected to the potentiometer arms 141 and 142 in opposite polarity arrangement so as to "buck" the potential existing across the potentiometer arms and provide a desired potential across grid leads 21 and 22 when the potential existing across the potentiometer arms is at the desired relation to the potential of the batteries. A dual potentiometer of this type is of advantage in combination with the rectifier circuit of the parent application S. N. 335,517 since it provides an equal load on both sides of the rectifier circuit between arm 141 to ground and arm 142 to ground. Another reason for using dual potentiometers in this circuit is the difficulty of obtaining potentiometers of the wire-wound variety having a sufficiently high resistance in a single unit. Thus the dual potentiometers provide twice the resistance of a single unit and supply a satisfactory load impedance for use in the output of a rectifier unit. The twin-triode tube 8, by reason of having its grids connected to the resultant potentials present in the leads 21 and 22, functions in response to an unbalance of the potentiometer circuit to control the relay circuits 29 and 33 to the motor in the same manner heretofore described.

In Figure 4 the numeral 9 represents the motor or power means to be operated according to the effects of the incoming signal as received at 127, 128, the two windings 10 and 11 providing for opposite directions of rotation of the motor under the control of the relay circuits 29 and 33. The motor 9 may operate through reduction gearing or other means to drive various mechanisms in the manner described in the parent applications, either the motor or its reduction gearing being also mechanically connected to the potentiometer arms 141 and 142 in such a manner as to rebalance the circuit in response to operation of the motor.

The motor 9 may include a magnetic brake and clutch, limit switches, and a centering mechanism, as illustrated in S. N. 335,517. Also, the rebalancing of the system may be accomplished by other circuit arrangements such, for instance, as are illustrated in other embodiments in S. N. 335,517, the present rebalancing arrangement being merely illustrative of a preferred arrangement for use with a particular receiver and amplifier.

Figure 5:
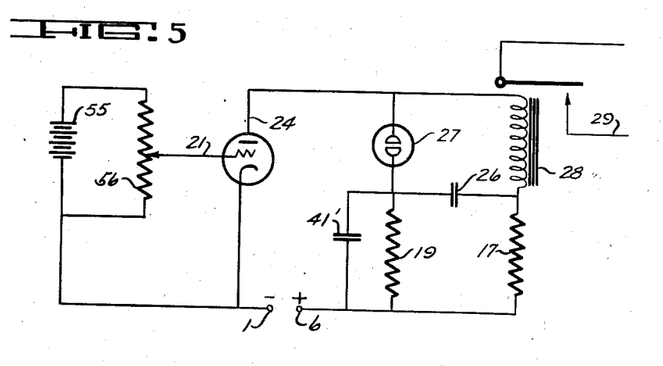
Figure 5 illustrates a system corresponding to the system shown in Figure 1 except that the condenser and gaseous discharge tube have been rearranged in the circuit, and a reactance has been added to increase the time intervals of operation.

The system in Figure 5 is similar to one-half of the push-pull system shown in Figure 3 except that the condenser 26 and gaseous discharge tube 27 have been interchanged so that the latter is now connected to the plate lead 24 and the relay 28. The condenser 26 has one terminal connected at the junction between the relay 28 and the resistance 17 and has its other terminal connected at the junction between the gaseous discharge tube 27 and the resistance 19. A current of sufficient value in plate circuit 24 will charge the condenser 26 through the resistance 19 to a potential which will cause ignition of the gaseous discharge tube 27. Thereupon the condenser 26 will discharge causing the operation of the relay 28. Thereafter the condenser 26 will receive a new charge and repeat the cyclic operation just described as in the other species, the resistance 17 being normally sufficient to prevent continuous energization of the relay 28 by the control current in the plate circuit 24. At the beginning of each cycle of operation the initial flow of charging current for condenser 26 reduces the potential across the gaseous discharge tube 27 so that it can not ignite until the charge on the condenser 26 has developed a potential equal to the ignition potential of the gaseous discharge tube. The action of the system in Figure 5 differs from that of the systems in Figures 1 to 3 in that proportionalizing is extended over a considerably greater range by reason of the fact that the control current flowing in the plate circuit 24 must rise to a far greater value to maintain the relay closed than in the systems of Figures 1 to 3. In Figure 5 a battery 55 and potentiometer 56 having a slider on the control grid connection 21 is illustrated as a specific means for regulating or adjusting the control voltage affecting the plate circuit 24. It is understood, however, that any other source of control voltage responsive to the condition to be controlled may be applied to the grid connection 21 to govern the plate circuit 24.

Figure 6:
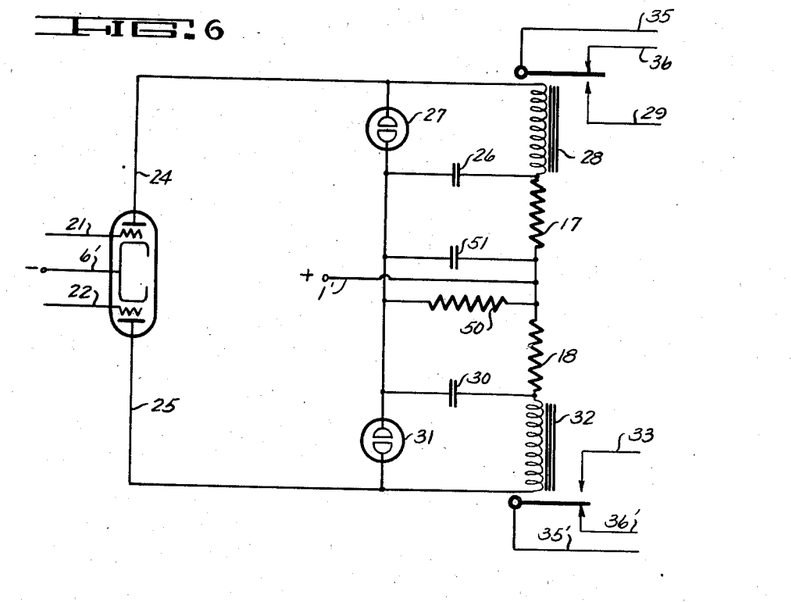
Figure 6 illustrates the system of Figure 5 modified to provide a push-pull arrangement, and having a resistance and reactance common to both sides of the push-pull system.

Figure 6 illustrates a system embodying the teachings brought out in the system illustrated in Figures 4 and 5. The condenser and gaseous discharge tube are arranged as in Figure 5, and the adaptation to a push-pull rrangement is made as in Figure 4. The operation of each relay is the same as the operation described in connection with the system of Figure 5, and the same advantages are obtained.

Figure 5 may also be modified according to Figure 3, instead of Figure 4, by providing individual resistances 19 and 20, and individual reactances 41 and 42, for the two sides of the circuit, for simultaneous operation of the relays 28 and 32.

Figure 7:
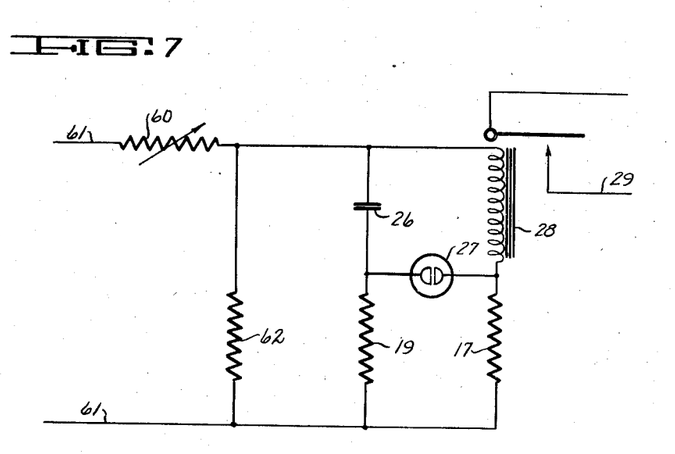
Figure 7 illustrates a modification basically similar to the system shown in Figure 1, but substituting a variable resistance for the vacuum tube in the source of control current.
Figure 8:
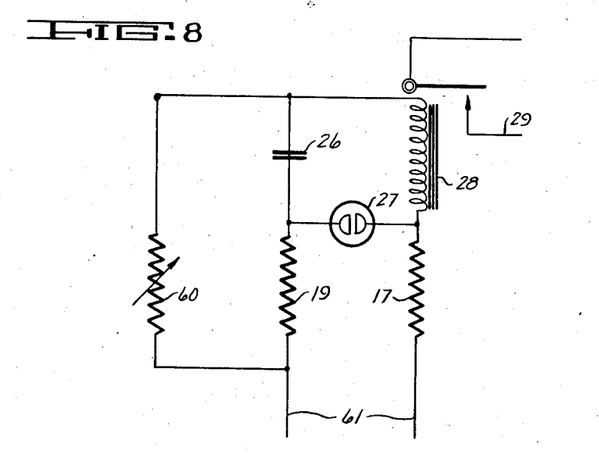
Figure 8 illustrates a modification of the system shown in Figure 7.

Figures 7 and 8 illustrate modifications of the proportionalizing circuits without a vacuum tube amplifier connected in the circuit. Heretofore it has been considered necessary to employ a vacuum tube amplifier to operate electromagnetic relays from control circuits carrying feeble control currents, but in the embodiments now to be described the proportionalizing system operates equally well without the use of vacuum tubes. It may be pointed out that the function of the vacuum tube in the proportionalizing circuits of the present invention is merely to serve a variable resistor whose resistance is being controlled by the variation of the grid potential on the grid of the tube. In Figures 7 and 8 the proportionalizing circuit operates a relay by changes in the conducting path of a photoelectric cell, or other variable resistance, taking the place of the vacuum tube shown in the previously described embodiments. Thus, the variable resistance 60 in Figure 7 may be described as representing a light sensitive cell or other variable resistance changing its value in response to the condition to be controlled. The same is true of Figure 8, showing a circuit modification which has the effect of changing the proportionalizing time for a given change in control current. Figure 8 however is not a basically different system, but is merely a slight modification to produce a different characteristic operation. The numeral 61 represents an electrical supply source, and 62 in Figure 7 indicates an additional resistor which is found to improve the operation of the system.

The systems shown in Figures 7 and 8 function similarly to the systems previously described in that the energy supplied to the line 61 is normally insufficient to operate the relay 28. This energy, under the control of the variable resistance 60, builds up a charge on the condenser 26 until the breakdown potential of the gaseous discharge tube 27 is attained, the condenser 26 then discharging through tube 27 to momentarily energize the relay 28 and close the power circuit 29. This operation accomplished, the condenser 26, which is now discharged, again begins to charge for a cyclic repetition of the operation, the time intervals of the cyclic operations being governed by the values of the variable resistance 60, just as it was governed in the previous embodiments by the variable effective resistance of a three-element vacuum tube.

The proportionalizing systems herein disclosed require a relatively few number of elements to provide the advantages set out. The principal element, in addition to the relay, resistors and condensers, is a tube or envelope having inside a gas whose characteristics are such that the gap between a pair of electrodes will break down or ionize with a definite potential impressed across the terminals. A condenser is selected having a value in conjunction with a resistor which will set up a time constant for the desired frequency of operation of the proportionalizer system under given conditions. In the modifications illustrated, the condenser charges to a given value equal to the ionization potential of the gas filled tube, and then discharges through said tube and relay to produce the desired control effects. The relay actuations by the proportionalizer may be used to control an electric motor or any electromechanical servomotor device. A relay of the type illustrated is not necessary to the invention, however, as any other type of power controlling device may be substituted. In some situations a mere resistor may be substituted for the relay if it is only desired to secure a pulsating voltage at a controlled rate dependent upon a variable input voltage, or current, which is varying in accordance with the response to some controlling element, or condition.

In the use of a magnetic relay the present proportionalizing systems provide an improved manner of operating the relay within very close limits of the put-in and drop-out current. In this manner they enable the using of an insensitive relay to sensitively control a large amount of power from an exceedingly small fraction of the controlled power.

It will, therefore, be seen from the above description, that this invention can be used wherever it is desired to effect a change in the speed of motion, or to stop a moving body, and will accomplish this change or stop with the most efficient consumption of power and in the shortest possible time, while maintaining extreme accuracy of position setting. Likewise the proportionalizing circuit could be reversed to provide a means for proportionalizing the application of power in starting a device in motion in order to bring the device from rest up to maximum speed in the smoothest possible manner by controlling the increments of power in a progressive fashion. Specific applications of the proportionalizer might be for use in slowing down a train at a railroad terminus, for use as a control for rolling mill machinery, as a temperature control for use with ovens where the temperature must be increased gradually and in small increments, or control for annealing ovens.

The above uses are merely illustrative of the almost unlimited fields of application of this control. Additional advantages and fields of application will occur to those skilled in the art, and it is accordingly intended that the invention be limited only by the scope of the appended claims.

I claim:

1. The method of exerting a resultant control effect proportional to the value of a source of control energy comprising cyclically accumulating and releasing said energy to exert said control effect, and causing the frequency of said cyclical operation to vary in accordance with the value of said energy.

2. The method of controlling the energization of power means in accordance with a source of varying control energy comprising storing said energy when the amount of said energy is less than that required to energize said power means, and discharging said stored energy to energize said power means when the amount of said stored energy becomes equal to said required amount.

3. The method of controlling the energization of power means in accordance with a source of varying control energy comprising storing said energy when said energy is less than the amount required to energize said power means, discharging said stored energy at intervals to periodically energize said power means when the amount of said stored energy becomes equal to said required amount, and continuously energizing said power means when said control energy equals or exceeds said required amount.

4. In a variable electrical circuit associated with a mechanical follow-up system adapted to respond to the variations of said electrical circuit, means for compensating for the inertia in the response of the mechanical system to said electrical circuit.

5. An electrical circuit for controlling the energization of power means in accordance with a source of varying energy external to said circuit comprising, a control element responsive to a predetermined value of energy, a source of energy in said circuit, variable means for normally limiting the energy delivered from said source to an amount less than said predetermined value to which said control element is responsive, means for applying to said variable means the varying energy from said external source to so control said variable means as to increase the amount of energy delivered from said source in accordance with the varying energy of said external source, and means for accumulating said energy when same is below the predetermined value and discharging same at intervals into said circuit to thereby increase the value of energy in said circuit to amounts in excess of said predetermined value while the amount of energy being delivered from said source is less than said predetermined value.

6. A proportionalizing control means comprising a control element responsive to a predetermined value of energy, a circuit for energizing said control element, and means for accumulating said energy when the same is below said predetermined value and discharging same into said circuit at intervals to operate said control element, said discharge being withheld until the value of said accumulated energy exceeds said predetermined value when the amount of energy supplied is less than said predetermined value.

7. A proportionalizing control means responsive to a varying voltage to exert a resultant control effect proportional to the value of said voltage, comprising cyclically operating energy accumulating and releasing means for energizing a control relay, the frequency of said cyclical operation varying in accordance with the value of said voltage.

8. A proportionalizing control means responsive to a varying voltage to exert a resultant control effect proportional to the value of said voltage comprising a condenser charged by said voltage, discharge means for said condenser, and a relay for accomplishing said control effects, said relay being energized by the discharge of said condenser.

9. In a system for controlling the energization of power means in accordance with a source of varying control energy, means for storing said energy when the amount of said energy is less than that required to energize said power means, and means for discharging said stored energy to energize said power means when the amount of said stored energy becomes equal to said required amount.

10. In a system for controlling the energization of power means in accordance with a source of varying control energy, means for storing said energy when said energy is less than the amount required to energize said power means, means for discharging said stored energy at intervals to periodically energize said power means when the amount of said stored energy becomes equal to said required amount, and means for continuously energizing said power means when said control energy equals or exceeds said required amount.

11. In a relay control system, a relay having an energizing circuit, a source of control current connected to said circuit, a resistance in said circuit to normally limit said control current to values insufficient to operate said relay, a condenser and gaseous discharge tube connected with said circuit so that upon ignition of said gaseous discharge tube said condenser is provided with a discharge path through said energizing circuit to operate said relay, and means utilizing said source of control current to charge said condenser.

12. In a relay control system, a relay having an energizing circuit, a source of control current connected to said circuit, a condenser and gaseous discharge tube connected with said circuit so that upon ignition of said gaseous discharge tube said condenser is provided with a discharge path through said tube and said energizing circuit to energize the latter to operate said relay, and a resistance associated with said circuit to create a voltage drop effective to enable said source of control current to charge said condenser to a potential sufficient to ignite said gaseous discharge tube.

13. In a relay control system, a relay having an energizing circuit, a source of varying control current connected to said circuit, said control current being normally insufficient to operate said relay, a condenser and gaseous discharge tube connected with said circuit so that upon ignition of said gaseous discharge tube said condenser is provided with a discharge path through said tube and said circuit to energize the latter to operate said relay, and a resistance associated with said circuit to create a voltage drop in said control current effective to periodically charge said condenser to a potential sufficient to ignite said gaseous discharge tube and discharge said condenser into said circuit to energize said circuit to operate said relay momentarily at intervals in accordance with the value of said control current when said control current is insufficient to continuously operate said relay.

14. In a relay control system, a relay having an energizing circuit, a source of varying control current connected to said circuit, said control current being normally insufficient to operate said relay, a condenser and gaseous discharge tube connected with said circuit so that upon ignition of said gaseous discharge tube said condenser is provided with a discharge path through said tube and said circuit to energize the latter to operate said relay, and a resistance associated with said circuit to create a voltage drop in said control current effective to periodically charge said condenser to a potential sufficient to ignite said gaseous discharge tube and discharge said condenser into said circuit to energize said circuit to operate said relay momentarily at intervals in accordance with the value of said control current when said control current is insufficient to continuously operate said relay, and a resistance associated with said circuit to normally prevent the passing of control current of sufficient value to maintain said gaseous discharge tube ignited.

15. In a relay control circuit, said relay being actuable at a predetermined current value, a source of electrical energy in said circuit; supply controlling means for supplying to said relay current in amounts varying from below to above said predetermined value; means associated with said relay circuit for actuating said relay intermittently when the current supplied from said supply means is less than the said predetermined value; said means comprising a resistance in series with said relay, a circuit connected in parallel with said relay and said resistance, said last-mentioned circuit having a condenser and resistance in series arrangement, a gaseous discharge tube having one terminal connected to the junction between said relay and said first mentioned resistance and having the other terminal connected to the junction between said condenser and said second mentioned resistance in said parallel circuit, said gaseous discharge tube having an ionization potential less than the voltage drop across said first mentioned resistance, and said second mentioned resistance being of sufficient value to limit the current flow therethrough to less than the deionization current of said gaseous discharge tube.

16. A relay control circuit as defined in claim 15 wherein there is further provided a reactance element in parallel with said second mentioned resistance to lengthen the time intervals of said intermittent actuations.

17. In a relay control system, a first circuit comprising a relay and a resistance in series arrangement, a second circuit connected in parallel with said first circuit, said second circuit having a condenser and resistance in series arrangement, and a gaseous discharge tube having one terminal connected to the junction between said relay and said first mentioned resistance, and having the other terminal connected to the junction between said condenser and said second mentioned resistance, the other ends of said resistances being connected together and to one line of a source of control circuit, and the other side of said relay and said condenser being connected to the other line of said source of control current.

18. In a relay control system, a first circuit comprising a relay and a resistance in series arrangement, a second circuit connected in parallel with said first circuit, said second circuit having a condenser and resistance in series arrangement, a gaseous discharge tube having one terminal connected to the junction between said relay and said first mentioned resistance and having the other terminal connected to the junction between said condenser and said second mentioned resistance, the other ends of said resistances being connected together and to one line of a source of electrical supply, and the other side of said relay and said condenser being connected to a source of control current, and a second pair of parallel circuits identical with those just described and connected therewith in "push-pull" arrangement, said second pair of circuits including a second relay and a second source of control current, and having a connection to said one line of a source of electrical supply in common with said first mentioned pair of circuits.

19. In a relay control system, a pair of parallel circuits, the first circuit comprising a relay, a first resistance, a second resistance, and a second relay serially connected in the order named; the second circuit comprising a first condenser, a first resistance, a second resistance, and a second condenser serially connected in the order named; a first gaseous discharge tube having one terminal connected to the junction between said first relay and said first resistance in said first circuit and having the other terminal connected to the junction between said first condenser and said first resistance in said second circuit; a connection between said two circuits uniting the junction between said first and second resistances in said first circuit and the junction between said first and second resistances in said second circuit, said connection leading to a source of electrical supply; a second gaseous discharge tube having one terminal connected to the junction between said second resistance and said second relay in said first circuit and having the other terminal connected to the junction between said second resistance and second condenser in said second circuit; a first source of varying control current connected to said first relay and said first condenser; and a second source of control current connected to said second relay and said second condenser.

20. In a relay control system, a pair of parallel circuits, the first circuit comprising a relay, a first resistance, a second resistance, and a second relay serially connected in the order named; the second circuit comprising a first condenser, a first resistance, a second resistance, and a second condenser serially connected in the order named; a first gaseous discharge tube having one terminal connected to the junction between said first relay and said first resistance in said first circuit and having the other terminal connected to the junction between said first condenser and said first resistance in said second circuit; a connection between said two circuits uniting the junction between said first and second resistances in said first circuit and the junction between said first and second resistances in said second circuit, said connection leading to a source of electrical supply; a second gaseous discharge tube having one terminal connected to the junction between said second resistance and said second relay in said first circuit and having the other terminal connected to the junction between said second resistance and said second condenser in said second circuit; a first source of varying control current connected to said first relay and said first condenser; a second source of control current connected to said second relay and said second condenser; a first reactance connected in parallel with said first resistance in said second circuit; and a second reactance connected in parallel with said second resistance in said second circuit.

21. In a relay control system, a pair of parallel circuits, the first circuit comprising a first relay, a first resistance, a second resistance and a second relay serially connected in the order named; the second circuit comprising a first condenser and a second condenser connected in series; a first gaseous discharge tube having one terminal connected to the junction between said first relay and said first resistance and having the other terminal connected to the junction between said condensers; a second gaseous discharge tube having one terminal connected to the junction between said second resistance and said second relay and having the other terminal connected to the junction between said condensers; a third resistance having one terminal connected to the junction between said first and second resistances and having the other terminal connected to the junction between said condensers; a reactance in parallel with said third resistance; a source of electrical supply connected to the junction between said first and second resistances; a first source of control current connected to said first relay and said first condenser; and a second source of control current connected to said second relay and said second condenser.

22. In a relay control system, a pair of parallel circuits, the first circuit comprising a relay connected in series with a resistance, the second circuit comprising a gaseous discharge tube connected in series with a resistance, a condenser having one terminal connected to the junction between said relay and the resistance in said first circuit and having the other terminal connected to the junction between said gaseous discharge tube and the resistance in said second circuit, a source of electrical supply connected in common to the other terminals of said resistances, and a source of varying control current connected to said relay and said gaseous discharge tube.

23. In a relay control system, a pair of parallel circuits, the first circuit comprising a first relay, a first resistance, a second resistance, and a second relay serially connected in the order named; said second circuit comprising a first gaseous discharge tube connected in series with a second gaseous discharge tube; a first condenser having one terminal connected to the junction between said relay and said first resistance and having the other terminal connected to the junction between said gaseous discharge tubes; a second condenser having one terminal connected to the junction between said second resistance and said second relay and having its other terminal connected to the junction between said gaseous discharge tubes; a third resistance having one terminal connected to the junction between said first and second resistances and having the other terminal connected to the junction between said gaseous discharge tubes; a reactance connected in parallel with said third resistance; said junction between said first and second resistances being connected to one terminal of a source of electrical supply; said first relay and said first gaseous electric discharge tube being connected in common to a source of varying control current; and said second relay and said second gaseous discharge tube being connected in common to a second source of varying control current.

24. In a relay control system, a pair of parallel circuits, the first circuit comprising a relay and a resistance in series, said second circuit comprising a condenser connected in series with a resistance, a gaseous discharge tube having one terminal connected to the junction between said relay and the resistance in said first circuit and having the other terminal connected to the junction between said condenser and the resistance in said second circuit, a source of electrical supply having one terminal connected to said resistances in common and having the other terminal connected to said relay and said condenser, and a variable impedance in circuit with said source of electrical supply.

25. In a relay control system, a relay and a first resistance connected in series, a condenser and a second resistance connected in a series, a gaseous discharge tube having one terminal connected to the junction between said relay and said first resistance and having the other terminal connected to the junction between said condenser and said second resistance, a variable resistance connected in parallel with said condenser and said second resistance, a common connection between said variable resistance, said condenser, and said relay, and a source of electrical supply having one terminal connected to said first resistance and having the other terminal connected to the junction between said second resistance and said variable resistance.

26. A proportionalizing control means comprising a control element responsive to a predetermined value of energy, a circuit for energizing said control element, and means for accumulating said energy when the same is below said predetermined value and discharging same into said circuit at intervals to operate said control element, said discharge being withheld until the value of said accumulated energy exceeds said predetermined value when the amount of energy supplied is less than said predetermined value.

27. A proportionalizing control means responsive to a varying voltage to exert a resultant control effect proportional to the value of said voltage, comprising cyclically operating energy accumulating and releasing means for energizing a control relay, said means including means for varying the frequency of said cyclical operation in accordance with the value of said voltage.

28. A proportionalizing control means responsive to a varying voltage to exert a resultant control effect proportional to the value of said voltage comprising a condenser charged by said voltage, discharge means for said condenser in circuit responsive to the potential across the condenser, and a relay with said discharge means for accomplishing said control effects, said relay being energized by the discharge of said condenser.

29. A device for controlling the operation of a reversible electric motor, comprising a source of electrical energy for energizing said motor, a pair of relays having front and back contacts for controlling the application of energy from said source to said motor, one of said relays being normally effective when energized to cause said motor to be operated in one direction and the other of said relays being normally effective when energized to cause said motor to operate in the opposite direction, an energy responsive control circuit connected with each of said relays for controlling the rate of operation of said motor, a source of varying control energy for each of said control circuits for applying the necessary control to said circuits, and circuit means, including the back contacts of said relays, for preventing both of said relays from applying energy to said motor at the same time.

EDWARD M. SORENSEN.